United States Patent [19]

Asakura et al.

[11] 4,387,380

[45] Jun. 7, 1983

[54] PRINTER

[75] Inventors: Osamu Asakura, Tokyo; Mineo Nozaki, Kawasaki, both of Japan

[73] Assignee: Canon Kabushiki Kaisha, Tokyo, Japan

[21] Appl. No.: 239,903

[22] Filed: Mar. 3, 1981

[30] Foreign Application Priority Data

| | | | |
|---|---|---|---|
| Mar. 6, 1980 | [JP] | Japan | 55-27404 |
| Mar. 6, 1980 | [JP] | Japan | 55-27405 |
| Jul. 4, 1980 | [JP] | Japan | 55-91466 |

[51] Int. Cl.³ .......................... G01D 15/10; B41J 3/04

[52] U.S. Cl. ................................ 346/76 PH; 400/120

[58] Field of Search .................. 346/76 PH; 400/120; 219/216 PH

[56] References Cited

U.S. PATENT DOCUMENTS

| | | | |
|---|---|---|---|
| 3,596,055 | 7/1971 | Elston | 346/76 PH X |
| 3,632,969 | 1/1972 | Walkow | 346/76 PH X |
| 3,857,470 | 12/1974 | Bastard et al. | 346/76 PH X |
| 3,987,882 | 10/1976 | Kobryn | 400/120 |
| 3,989,131 | 11/1976 | Knirsch et al. | 346/76 PH X |
| 4,219,824 | 8/1980 | Asai | 400/120 X |

*Primary Examiner*—Donald A. Griffin

*Attorney, Agent, or Firm*—Fitzpatrick, Cella, Harper & Scinto

[57] ABSTRACT

A printer is disclosed which comprises a recording head for recording information on a recording medium and control means for shifting the position of the recording head relative to the recording medium subsequently to the ending of a recording on the recording medium by the recording head at a record end position preset for the recording medium.

13 Claims, 11 Drawing Figures

PRINTER

BACKGROUND OF THE INVENTION

1. Field of the Invention

The present invention relates to a printer of the type in which a heat fusible ink on a transfer material is melted by a thermal head and the melted ink is transferred onto a printing paper to effect printing.

2. Description of the Prior Art

For the conventional serial type thermal printing system, the problem of adhesion between the thermal head and the heat sensitive paper has already been solved due to a great effort made over a long time. Presently available in this type of thermal printer, the thermal head can be returned to the print starting position without any trouble immediately after the end of printing.

However, the case is different for the transfer type thermal printing system in which no heat sensitive paper is used and instead a transfer material such as transfer tape is interposed between a common paper and a thermal head to effect printing on the common paper by the thermal head through the transfer tape. In the case of this thermal transfer printing system, the problem of adhesion between the transfer tape and the printing paper has not yet been solved. In the printer, the transfer tape remains stuck on the recording paper even after the end of printing.

In order to separate the stuck transfer tape from the paper by pulling the tape in the direction in which the thermal head is moved, namely in the direction normal to the adhesion, a large amount of force will be required. In addition, in view of means for holding the recording paper in the position, such pulling force in the direction normal to the adhesion should be avoided. Therefore, separation must be done by pulling the tape in the direction of adhesion. Furthermore, the area of stuck portion must be reduced as much as possible. It may be considered to use a particular power source for mechanically separating such stuck transfer tape from the paper. However, this solution makes the mechanism of the printer complicated and no stable operation can be expected. This problem of adhesion, therefore, constitutes the most important drawback of the known thermal transfer printing system. For better understanding of the subject of the present invention, some further description of the above problem will be made hereinafter with reference to FIGS. 1 through 3.

FIG. 1 schematically shows the structure of an ink ribbon generally used in the thermal transfer printing system. The ink ribbon comprises a base member 1 which may be a film of polyester and an ink layer coated on the base member. The ink layer contains pigment or dye 2 such as carbon black dispersed in a heat fusible binder 3.

FIGS. 2 and 3 illustrate the manner of printing through the ink ribbon. A thermal head 4 is brought into contact with the ink ribbon on the side of its base member 1. An electric current is applied to a heating resistor 5 provided on the thermal head 4 to heat the ink ribbon. A portion of the binder 3 heated by the heating resistor 5 is selectively melted, and the fused portion is transferred onto a printing paper 6. In this manner, printing is performed.

To prevent hands or printing paper from being made dirty by the ink ribbon when contacted, the binder 3 must be coated on the base member 1 with some degree of adhesion. The binder usually has a high degree of affinity to common papers. Therefore, in the phase immediately after thermal transferring as shown in FIG. 2, the ink ribbon and the printing paper 6 are stuck together. At the next step, the printing paper 6 has to be stripped from the ink ribbon with only the printed portion *3a* being adhered to the printing paper as shown in FIG. 3.

In the thermal transfer printing apparatus, the stripping step may be carried out after the end of printing one line of characters or several words and during the time in which the next printing is being carried out. However, there may occur a case where the ink ribbon is used up in the middle of printing. In this case, the ink ribbon must be exchanged for a new one while the old ink ribbon is still stuck on the printing paper. To exchange ink ribbons in this state the stuck ink ribbon must be stripped from the printing paper by hand. This is not only time consuming but also damaging. The printing paper 6 may be made dirty or broken and parts of the thermal head 4 also may be damaged during stripping by hand. This is the greatest disadvantage involved in the known thermal printer.

SUMMARY OF THE INVENTION

Accordingly, it is a general object of the invention to provide an improved printer which overcomes the disadvantage mentioned above.

More specifically, it is an object of the invention to provide an improved printer of the type in which a thermal head is stepwise driven and brought into contact with a platen through a printing paper and a transfer material to effect printing. Also to provide an improved printer which is provided with a platen long enough to further move the relative position between the thermal head and the printing paper beyond the relative position at the end of printing in order to separate the transfer material stuck on the printing paper by printing from the latter.

It is another object of the invention to provide the above mentioned type of printer and to provide an improved printer which is provided with a platen long enough to further move the thermal head beyond the print end position preset for the thermal head in order to separate the stuck transfer material from the printing paper.

It is a further object of the invention to improve the above mentioned type of printer and to provide an improved printer in which the relative position between the thermal head and the printing paper can be moved further beyond the relative position at the end of printing in order to separate the stuck transfer material from the printing paper.

It is still a further object of the invention to improve the above mentioned type of printer and to provide an improved printer which is provided with control means for returning the thermal head to its print start position after moving it further beyond the print end position preset for it in order to separate the stuck transfer material from the printing paper.

It is another object of the invention to provide a thermal transfer printing apparatus in which the ink ribbon can automatically be stripped from the printing paper when the ink ribbon is used up in the middle of printing.

It is a further object of the invention to provide a printer of the above mentioned type in which the carriage is moved in the opposite direction to the direction for printing when the ink ribbon is used up.

It is still a further object of the invention to provide a printer of the above mentioned type in which the carriage is further moved in the direction for printing when the ink ribbon is used up.

To attain the above objects according to an aspect of the invention there is provided a printer comprising a recording head for recording information on a recording medium, and means for shifting the relative position of the recording head to the recording medium subsequent to the end of printing by the recording head at a record end position preset for the recording medium.

According to another aspect of the invention there is provided a printer comprising a recording head for recording information on a recording medium, control means for controlling the breadth of record available for recording information on the recording medium by the recording, and means for moving the relative position between the recording head and the recording medium further beyond the record breadth controlled by said record breadth controlling means.

According to a further aspect of the invention there is provided a printer comprising a thermal head provided with a heating resistor, an ink ribbon containing heat fusible ink through which said thermal head is pressed against a recording paper to effect printing on the recording paper with the ink then fused, means for detecting the end of the ink ribbon, means for shifting the position of the thermal head relative to the recording medium in response to the detection of the ribbon end by said detecting means, and means for stripping the ink ribbon according to the direction of shift by said shifting means.

Other and further objects, features and advantages of the invention will appear more fully from the following description of preferred embodiments and the accompanying drawings.

DESCRIPTION OF PREFERRED EMBODIMENTS

Figure 1:
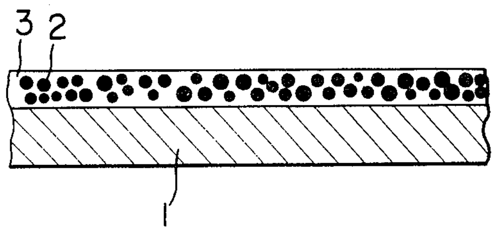
FIG. 1 is a schematic cross-sectional view of a heat fusible ink ribbon for illustrating the structure thereof.
Figure 2:
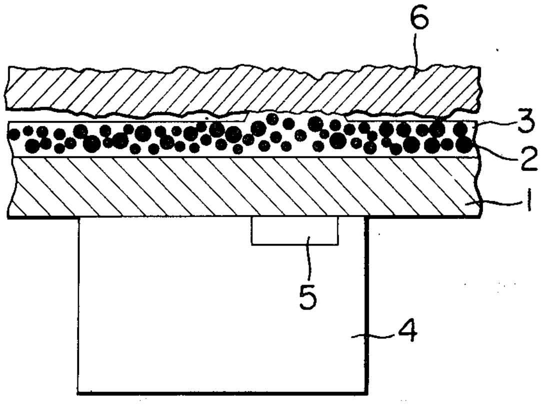
FIGS. 2 and 3 illustrate the manner of thermal transfer with the ink ribbon in two different phases.
Figure 3:
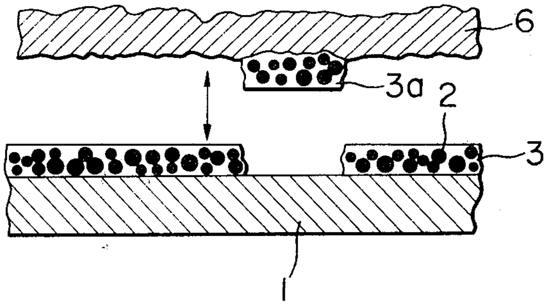
Figure 4:
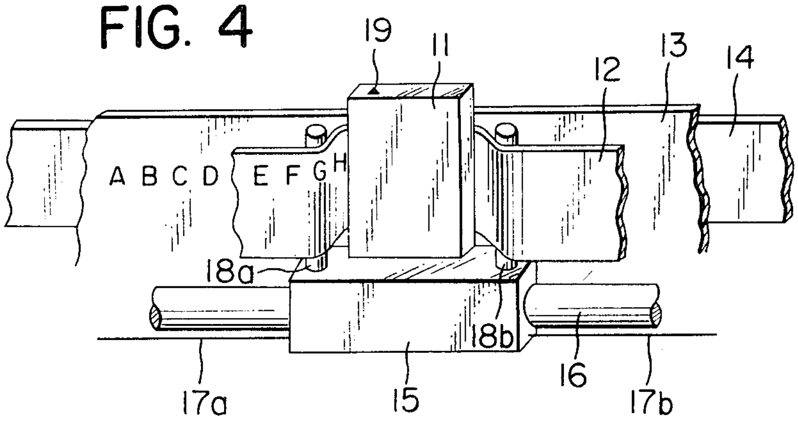
FIG. 4 shows an embodiment of printer according to the invention.

Referring to FIG. 4 showing an embodiment of the invention, a thermal head is designated by 11. The thermal head 11 generates selectively at positions determined according to a character pattern to be printed. Reference numeral 12 is a transfer tape formed of transfer material containing heat fusible ink, while reference numeral 13 is a printing paper. In response to a thermal pattern formed by the thermal head 11 according to the character pattern, the transfer tape 12 is fused at determined points and the fused ink is transferred onto the printing paper 13. Reference numeral 14 is a platen which is designed somewhat longer than the conventional one for the purpose of separation of the transfer tape from the printing paper as will be described in detail later.

Designated by 15 is a carriage on which the thermal head 11 is mounted. The carriage 15 slides along a shaft 16 extending in parallel with the platen 14. To move the carriage 15 rightwards and leftwards along the shaft 16 there are provided belts 17*a* and 17*b* connected with the right- and left-hand sides of the carriage respectively. Reference numerals 18*a* and 18*b* are tape guide pins. To promote the separation of transfer tape 12 from printing paper 13, the guide pins 18*a* and 18*b* are disposed in such manner that the moving direction of thermal head 11 and the discharging direction of transfer tape 12 form a determined angle. Reference numeral 19 is a mark for indicating the position of print dot of the thermal head 11. In the shown embodiment, the mark 19 is provided on the top surface of the head 11.

Figure 6:
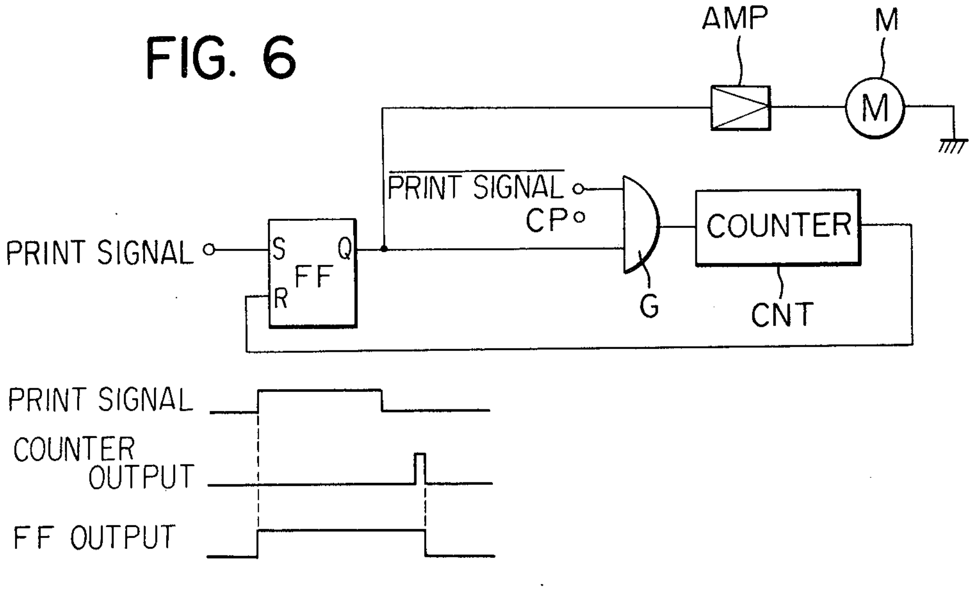
FIG. 6 is a circuit diagram of the control thereof.

The thermal head 11 is driven by a control circuit as shown in FIG. 6.

In FIG. 6, FF is a flip-flop which is set by a print signal and puts out a signal of "H" from its terminal S. G is an AND gate which receives print signal, clock pulse CP and output from the terminal Q of flip-flop FF. CNT is a counter for counting the clock pulse CP passed through AND gate G. The counter CNT produces a counter output when it has counted a predetermined number of the clock pulses. This counter serves as a timer. The counter output is applied to the resetting terminal R of flip-flop FF the output Q of which is being applied to a motor M through an amplifier AMP. The motor M is connected with the above mentioned belts 17*a* and 17*b* to move the thermal head 11 from left to right.

Figure 5:
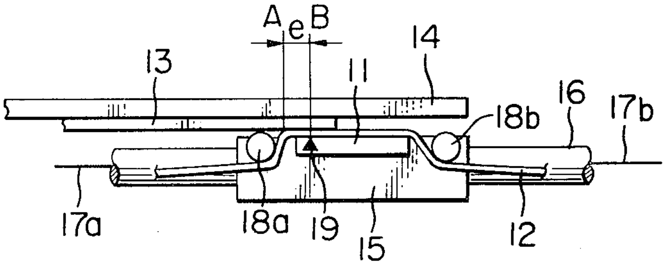
FIG. 5 is a top view of the embodiment shown in FIG. 4.

The manner of operation of the above embodiment is as follows:

With the start of printing control, the thermal head 11 carries out printing while pressing the transfer tape 12 and recording paper 13 against the stationary platen 14 in the same manner as that in the case of thermal printing system. Print signal is applied to flip-flop FF and the motor M is driven by "H" signal from terminal Q of flip-flop FF. The motor now in operation drives the belts 17*a* and 17*b* to move the carriage 15 together with the head 11 mounted thereon. Thus, the carriage slide-moves along the shaft 16 in parallel with the platen 14. The thermal head 11 continues printing while pressing the transfer tape 12 and printing paper 13 against the platen 14. During this printing motion, the transfer tape and printing paper remain stationary and only the thermal head 11 moves at a uniform speed. To minimize the area where the transfer tape 12 and the printing paper 13 stick together, the tape guide pins 18*a* and 18*b* on the both sides of the head 11 keep the transfer tape 12 apart from the printing paper 13 excepting the portion pressed into contact with the platen by the thermal head. However, as shown in FIG. 5, there exists a stuck portion of l in length between the print dot position indicating mark 19 and a point immediately before the tape guide pin. If the thermal head 11 is moved back toward its print start position at once at the print end point indicated by A in FIG. 5, then the recording paper 13 and transfer tape 12 stuck together will be twisted with the movement of the head and the printing paper may be broken at last by the force acting on it in the direction parallel to the platen. To eliminate such trouble, the print dot position indicating mark 19, namely the thermal head, is further moved from the print end point A to a point B by the distance corresponding to the length l of the stuck portion.

To this end, AND gate G is opened by the print signal and "H" signal of output Q from the flip-flop so as to make the counter CNT receive clock pulses CP. The counter CNT counts the number of the received clock pulses CP and when the number reaches a determined value, the counter produces a counter output. During the period of this counting operation of counter CNT, the thermal head 11 is moved up to the point B. In response to the counter output from the counter CNT, the flip-flop FF is reset to stop the motor M. In this manner, the transfer tape 12 is separated from the printing paper 13 at the stuck portion. After completing the separation, the thermal head 11 can be moved back toward its print start point by returning means not shown, without any possibility of the printing paper 13 and transfer tape 12 being damaged. However, since the thermal head 11 in this position abuts against the platen 14, the latter is required to have a sufficient length enough to cover all the moving range of the thermal head 11. Otherwise the thermal head 11 overruns the platen 14 and therefore the head or other driving member such as driving belt 17 may be broken. For this reason, in the printer according to the present invention, the platen 14 is lengthened sufficiently enough to cover the overrun distance l required to separate the stuck transfer tape from the printing paper. After overrunning from A to B, the thermal head 11 is driven to move backward up to the print start position where the thermal head is waiting for the next print signal.

While in the above embodiment the thermal head has been moved relative to the platen, the present invention is also applicable to a printer of the type in which the thermal head is stationary and the platen is moved relative to the fixed thermal head. The print end point A may be any point in the printing paper. For any end point A, the thermal head 11 is moved back after overrunning the point A some distance.

As readily understood from the above embodiment, the present invention has solved the problem of adhesion between transfer tape and printing paper inherent in a transfer type thermal printer in a very simple manner. The thing required is only to lengthen the moving distance range of the thermal head relative to the print range. No additional mechanical mechanism is required therefor. Adhesion can be removed off by a simple and reliable operation. The transfer type thermal printer according to the invention is stable in operation and high in durability.

Another embodiment of the invention is described hereinunder with reference to FIGS. 7 to 10.

Figure 7:
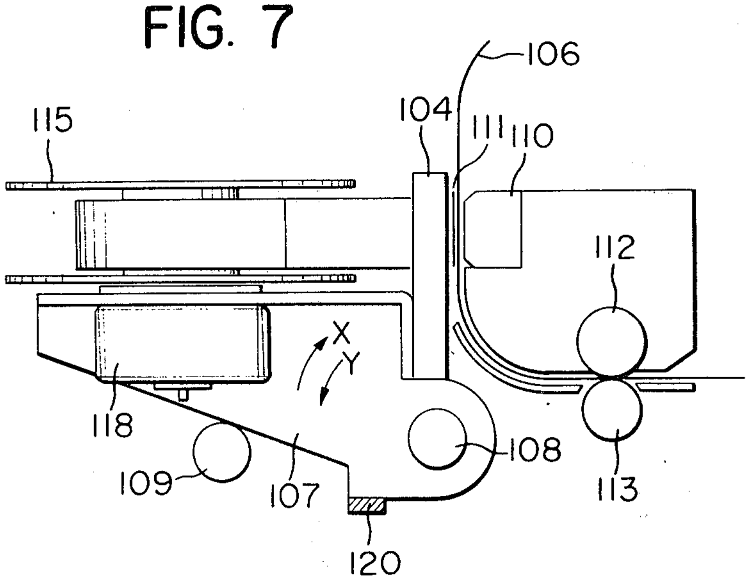
FIGS. 7 and 8 show another embodiment of the invention in side view and in plan view respectively.

In FIG. 7, reference numeral 107 designates a carriage mounted on a guide shaft 108 for slide movement along and rotation about the shaft. A pressing shaft 109 is in contact with the underside surface of the carriage 107. The pressing shaft 109 can be rotated by a solenoid or the like (not shown) so that when pressure is applied to the underside surface of the carriage by the pressing shaft, the carriage is rotated clockwise (direction of arrow X in FIG. 7) about the shaft 108 and when the pressure is removed, the carriage is rotated counter-clockwise (direction of arrow Y). A thermal head 104 is mounted on the carriage for movement together with the carriage. Therefore, when the carriage is rotated clockwise, the thermal head 104 is moved to press ink ribbon 111 and printing paper 106 against platen 110 for printing. When the carriage is rotated counter-clockwise, the thermal head 104 is moved in the direction apart from the ink ribbon and printing paper and returned to its print start position.

At the lower side of the platen 110 there are provided a pair of feed rollers 112 and 113 for feeding the printing paper 106. On the carriage 107 there are provided an ink ribbon feeding reel 114 and an ink ribbon take-up reel 115 supported by pins 116 and 117 respectively. The ink ribbon 111 drawn out from the feed reel 114 passes over the front of the head 104 and then it is taken up on the take-up reel 115.

Under the take-up reel 115 there is provided a motor 118 for taking up the ink ribbon. Under the feed reel 114 there is another motor 119 for rotating the feed reel in the opposite direction to the printing direction through a clutch (not shown).

Figure 8:
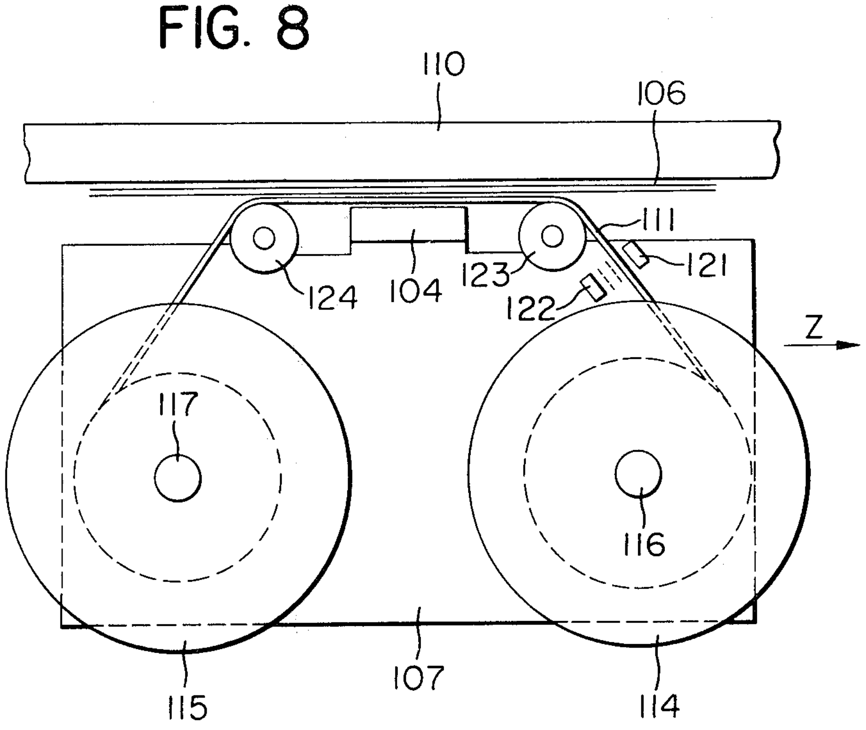
Figure 9:
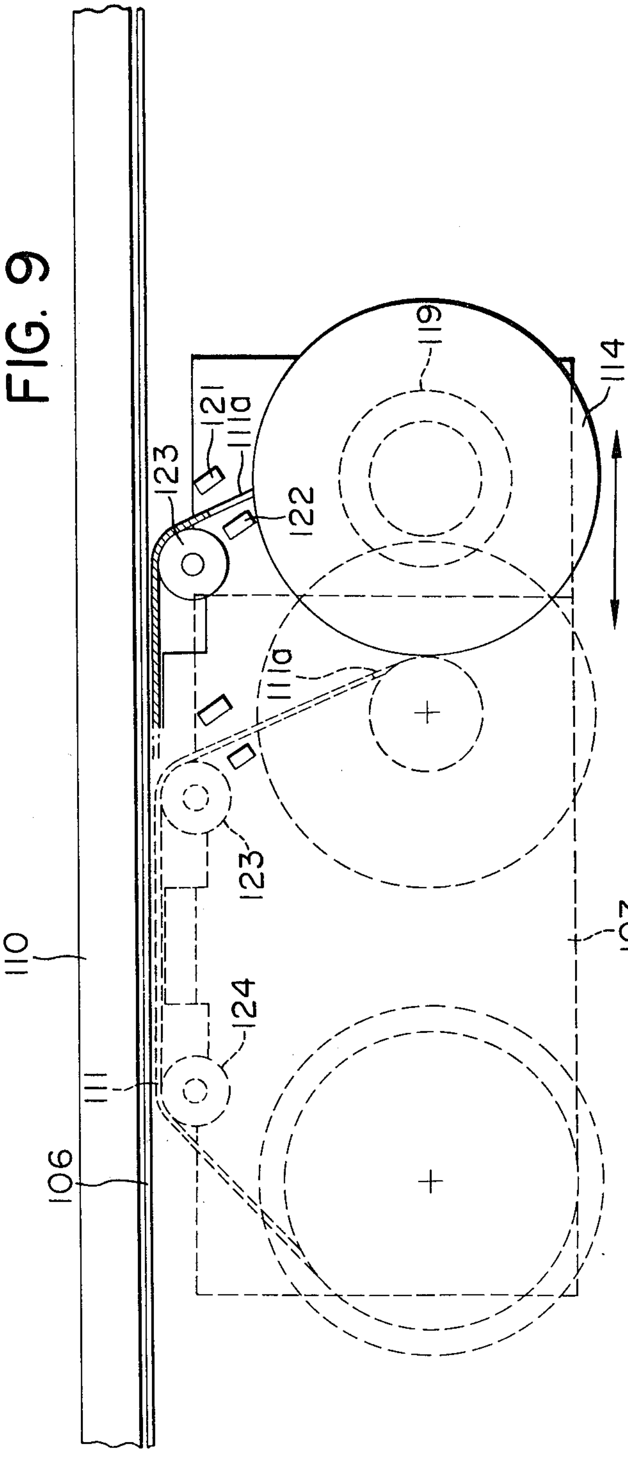
FIG. 9 is a plan view of the embodiment illustrating the manner of operation thereof.

The thermal head 104 mounted on the carriage 107 may be formed of, for example, 5×7 dots of heating resistors. A driving belt 120 is fixed to the underside of the carriage 107 to move the latter. The driving belt 120 is driven by a stepping motor (not shown) which is in turn driven by means of control signal issued from a controller (not shown). Also, a pair of photo couplers 121 and 122 are provided on the carriage 107 and in the vicinity of the feed reel 114 (FIGS. 8 and 9). The photo couplers 121 and 122 are disposed opposed to each other relative to the running path of the ink ribbon 111 drawn out from the feed reel 114 so as to detect the presence of ink ribbon 111 running between the two photo couplers.

On the carriage 107 there are provided also pinch rollers 123 and 124 which are moved toward the printing paper 106. The ink ribbon 111 is guided from feed reel 114 to take-up reel 115 passing around the pinch rollers 123 and 124 as seen best in FIG. 9.

Figure 10:
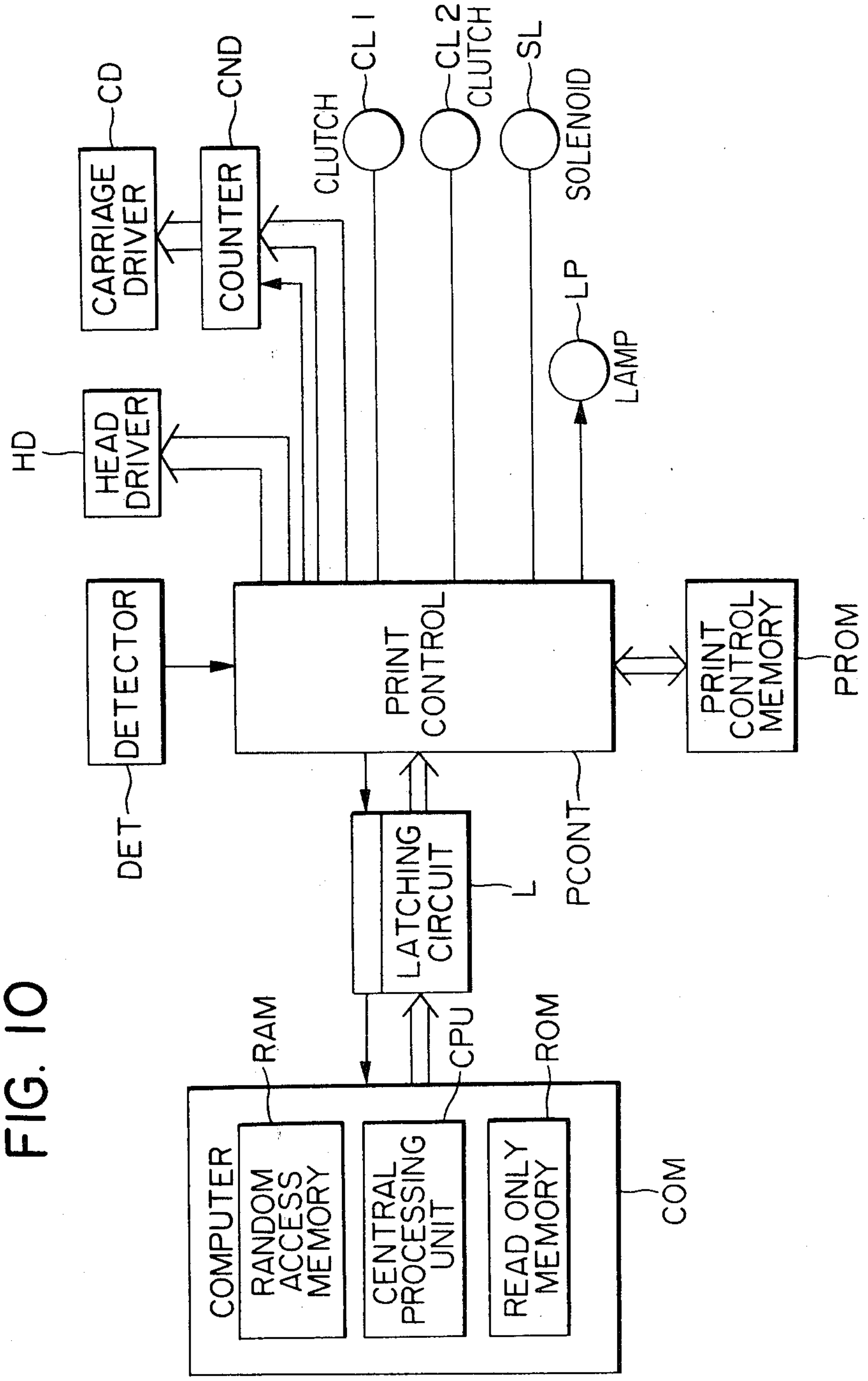
FIG. 10 is a view of illustrating the manner of control thereof.

FIG. 10 is a block diagram of the control part for controlling the operation of the above described printer.

In FIG. 10, reference character COM designates a computer comprising a random access memory RAM, a read only memory ROM and a central processing unit CPU.

In the memory RAM, data to be recorded are stored. In ROM there are stored the sequence of control for reading out the data stored in RAM and the sequence of control for stopping the readout of data which is executed depending on the signal produced in response to the end of ink ribbon as described later. The central processing unit CPU reads out the control sequence stored in ROM and executes it.

L is a latching circuit which serves as a provisional memory for storing a print instruction or data in an amount of one character as well as a signal informing of the end of ink ribbon.

PROM is a print control memory in which a sequence of control as described later in connection with the operation of the embodiment is stored.

DET is a detector corresponding to the photo couplers 121 and 122 mentioned above and shown in FIG. 8. HD is a head driver for driving the thermal head. CD is a carriage driver for driving a stepping motor (not shown) by which the carriage 107 is moved.

CND is a counter which is able to count up and count down. For this type of counter, an initial value and the direction in which counting should be done can be set.

CL1 is a clutch for connecting or cutting off the rotation of the motor 118 by which the ink ribbon take-up reel 115 is driven. CL2 is a clutch for connecting or cutting off the rotation of the motor 119 by which the ink ribbon feeding reel 116 is driven in the reversed direction.

SL is a solenoid for driving the pressing shaft 109. PCONT is a print control for operating the individual controlled objects mentioned above and dealing with the signal from the detector DET in accordance with the control sequence stored in the print control memory PROM.

The manner of operation of the above embodiment is as follows:

In the print starting position in which the carriage is waiting for printing, no current is applied to the solenoid SL and therefore the pressing shaft 109 can not apply any pressure to the underside surface of the carriage. The carriage 107 rotates counter-clockwise about the guide shaft 108 shown in FIG. 7 up to its starting position. In this starting position, therefore, the thermal head 104 is apart from the platen 110.

To start printing from the above position, a print start instruction is issued from computer COM. The instruction is transmitted to the print control PCONT through the latching circuit L. Now, current is applied to the solenoid SL which drives the pressing shaft 109. The carriage 107 is rotated clockwise about the guide shaft 108 by the pressure applied to the underside surface of the carriage by the pressing shaft 109. The thermal head 104 is brought into contact with the platen 110 through the ink ribbon 111 and printing paper 106.

In this position, a print instruction is applied to the stepping motor (not shown) to move the driving belt 120. The carriage 107 driven by the belt starts running in the printing direction. During the running of carriage 107 in this direction, control signals corresponding to the characters to be printed are applied to the head driver HD for driving the thermal head 104 formed of 5×7 dots of heating resistors so that the selected word is transferred onto the printing paper 106. During printing, the pinch rollers 123 and 124 for guiding the ink ribbon 111 are kept in contact with the platen 110.

When one word amount of characters have been printed, the content of counter CNP gets an increment and the carriage is further moved one step corresponding to one character distance in the direction of arrow Z in FIG. 8 to carry out the next printing. While the carriage 107 is stepwise moved in this manner, the relative positional relation between the ink ribbon 111 and printing paper 106 remains unchanged during the time because the pinch roller 123 continues pressing the ink ribbon against the printing paper 106. The feed reel 114 feeds the ink ribbon 111 in an amount just equal to the amount of the ink ribbon then moved relative to the carriage.

As clearly seen from FIG. 8, the thermal head 104 is located about the middle between the two pinch rollers 123 and 124. Therefore, the pinch roller 124 disposed on the side of the take-up reel 115 can reach the position of first printed character only after the thermal head has already printed several characters subsequent to the first printed character. Although the take-up reel 115 takes up the ink ribbon 111 with the movement of the carriage and in an amount corresponding to the distance passed by the carriage, the ink ribbon remains stuck on the printing paper until the pinch roller 124 reaches the position of the first printed character. For example, the pinch roller 124 can reach the position of the first printed character after five characters have been printed, the number of characters being, of course, variable depending upon the spacing between the two pinch rollers 123 and 124. After the pinch roller 124 has reached the position of the first printed character, the ink ribbon 111 is taken up onto the take-up reel 115 with the subsequent movement of the carriage 107. When the ink ribbon is taken up, it is curved about the pinch roller toward the take-up roller 115. Therefore, the ink ribbon 111 is separated from the printing paper and only the fused and printed portion of the ink ribbon is left on the printing paper 106 at this time.

In this manner, printing proceeds and the ink ribbon 111 is successively separated from the printing paper. Finally, the ink ribbon is used up. As shown in FIG. 9, the ink ribbon 111 has a leader portion 111*a* connected with the end portion of the ribbon. The leader portion 111*a* is made of a transparent synthetic resin or the like. When the ink ribbon 111 is consumed up to a part near the end of the ribbon, the transparent leader portion 111*a* enters between the photo couplers 121 and 122. As a result, the couplers are made conductive and a signal informing of the end of ink ribbon is introduced into the print control PCONT which then issues a signal to the latching circuit L. In response to the signal applied to the latching circuit L, the computer COM terminates the read out of data after sending one character amount of data to the latching circuit L. On the other hand, the print control PCONT confirms the absence of data in the latching circuit after completing the printing of the last data introduced into it. After confirmation, PCONT reads out the data for controlling the stepping motor stored in the print control memory PROM and sets the control data on the counter CNT. In the case now being discussed, the rotational direction of the motor to be set is the printing direction, namely the forward direction. Also, a determined value is set on the counter.

Every time when the counter gets one increment, the stepping motor is rotated one step to further move the carriage. When the content of the counter CNT has reached the set value, the print control PCONT confirms it and stops the operation of the counter to terminate the movement of the carriage. During the time, the ink ribbon 111 continues to be taken up onto the take-up reel by the motor 118. Thus, the portion of the ink ribbon stuck on the printing paper 106 is completely separated from the paper leaving only the printed portion on the printing paper. In this manner, by further moving the carriage a further distance after printing the last character in the case of the end of ink ribbon, the remaining adhesion between the ink ribbon and printing paper can be removed completely. When the end of ink ribbon has been detected and the last character has been printed, the ink ribbon and the printing paper remain stuck together at the portion extending from the pinch roller 124 and the position of the last printed character. Therefore, the stuck ink ribbon can be stripped from the printing paper completely by further moving the carriage by a distance corresponding to the above distance from the pinch roller and the position of the last printed character. Also, in this case, a lamp LP is put on to indicate that the ink ribbon needs to be exchanged.

Various modifications may be made in the above embodiment. For example, instead of the open reel type shown in the embodiment, cassette type reels also may be used. The number of dots contained in the thermal head is never limited to 5×7 only. Also, to detect the ink ribbon there may be used other means than a photo coupler.

As readily understood from the foregoing, the present invention has a particular advantage, i.e. its exchange of ink ribbon. When the ink ribbon is used up in the middle of printing, the end of ink ribbon is detected to terminate the printing. Subsequent to the end detection, the carriage is further advanced a distance sufficient enough to cover the area where the ink ribbon and the printing paper remain stuck together while printing is stopped. By moving the carriage a further determined distance after the printing is stopped, the stuck portion of the ink ribbon can be stripped automatically. Stripping the ink ribbon from the printing paper by hand as conventionally required is no longer necessary. Therefore, the ink ribbon can be exchanged for a new one vey easily.

In the above embodiment shown in FIGS. 7 through 10, the present invention has been applied to such a type of printer having ink ribbon feeding and take-up reels mounted on a head carriage. However, the present invention is also applicable to another type of printer in which the ink ribbon reels are not mounted on the carriage but are supported by another member as shown in FIG. 11.

Figure 11:
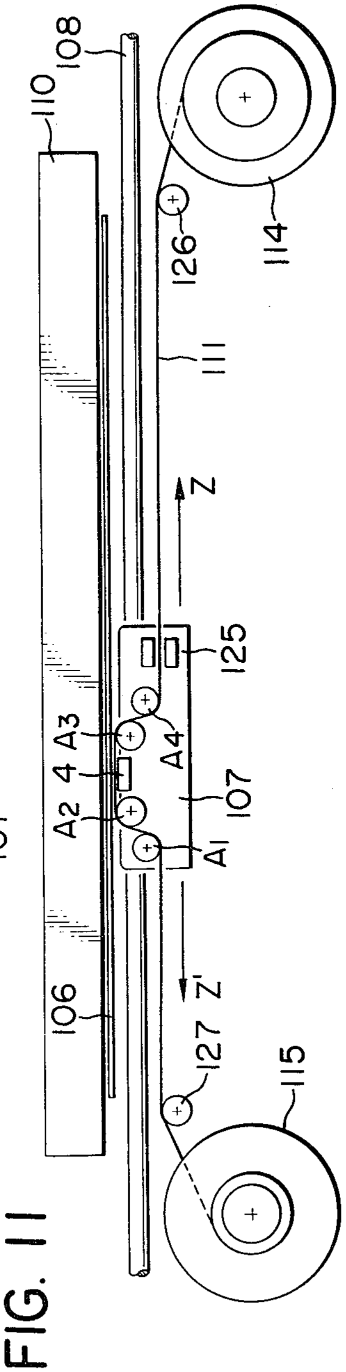
FIG. 11 shows a further embodiment of the invention.

In FIG. 11, reference numeral 107 again designates a carriage while 110 is a platen and 108 is guide rail. The guiderail extends in parallel with the platen 110. The carriage 107 is mounted on the guide rail for slide movement in the directions Z and Z'. For printing, the carriage is moved in the direction of arrow Z along the guide rail by a stepping motor (not shown). At the end of printing, the carriage is moved in the direction of arrow Z' for high speed carriage return.

The carriage 107 carries thereon a thermal head 104, four guide rollers $A_1$ to $A_4$ and ribbon detector 125.

In the vicinity of the both ends of the platen 110 there are provided an ink ribbon feed reel 114 and an ink ribbon take-up reel 115. In this embodiment, the two reels 114 and 115 are mounted on the base member of the printer not shown. The ink ribbon 111 is guided from the feed reel to the take-up reel through two guide rollers 126 and 127 which are also supported on the base member. The take-up reel 115 is operatively connected with a stepping motor (not shown) to take up the ink ribbon 111.

The thermal head 104 is brought in its printing position by a solenoid (not shown) and pressed against the printing paper 106 through the ink ribbon 111. Guide rollers $A_1$ to $A_4$ are rotatably mounted. The ink ribbon 111 is guided to and from the guide rollers $A_1$ to $A_4$ by the guide rollers 126 and 127 which are so disposed as to guide the ink ribbon along a running path spaced from the platen by a constant distance. At the thermal head part of the carriage 107, the ink ribbon is guided toward the surface of printing paper by the guide rollers $A_1$–$A_4$. Guide rollers $A_2$ and $A_3$ serve also as stripping means for separating the ink ribbon stuck on the printing from the latter. It is not always necessary to press the guide rollers $A_1$–$A_4$ toward the platen 110.

The starting position, that is, waiting position of the carriage 107 is located at the left-hand end of the platen as viewed in FIG. 11. To carry out printing, the carriage is slide moved along the guide rail 108 in the direction of arrow Z from the waiting position. As soon as the carriage reaches a certain selected point on the guide, the solenoid (not shown) is excited to bring the carriage into its printing position in which the carriage is in pressure-contact with the printing paper 106 through the ink ribbon 111. In this position, printing is performed while the carriage is running in the direction Z.

During this movement of carriage for printing, the take-up reel 115 remains stopped and the ink ribbon 111 and the printing paper 106 have no relative speed therebetween. At the printed portion, the ink ribbon 111 sticks on the printing paper 106. The carriages continues moving in the direction Z while carrying out printing. After the carriage has moved up to the position in which the guide roller $A_2$ reaches the area of the stuck portion of the ink ribbon, the stuck ink ribbon is separated from the printing paper along the guide roller $A_2$. When one line of printing has been completed and the guide roller $A_2$ has reached the position of the last printed character of the line, separation of ink ribbon from printing paper is finished. At this time point, pressure on the thermal head is removed to bring it back to its retracted position and then the carriage is moved back in the direction of arrow Z' at a higher speed. Simultaneously with the high speed carriage return, the take-up reel 115 is driven by a motor to take up an amount of one line used ink ribbon 111, and an amount of one line unused ink ribbon is fed from the feed reel 114. Thus, the printer is prepared for the next line of printing.

If the inkribbon is used up at the middle of printing, then the end of ink ribbon is detected by a ribbon detector 125. In this case, the character which is still in printing at the time of end detection is printed completely and thereafter the printing is stopped. The pressure on the thermal head 104 is removed and then the carriage is moved in the opposite direction to the printing direction. During this movement of the carriage in the opposite direction, the stuck portion of the ink ribbon which has not been separated yet by the guide roller $A_2$ can be separated from the printing paper by the guide roller $A_3$ on the opposite side to $A_2$. After completing the separation, the carriage 107 is stopped and ribbon exchange is indicated at the same time.

In the manner described above, the present invention is applicable also to such a type of printer in which the ink ribbon reels are not mounted on the carriage 107 but mounted on another member.

As seen from the foregoing, the present invention brings forth remarkable advantages over the prior art transfer type thermal printers. In transfer type thermal printers, a thermal transfer ink ribbon is used which is selectively fused by heating resistors of a thermal head to effect printing while transferring the fused ink on a printing paper. According to the above embodiment, when the ink ribbon is used up in the middle of printing, the end of ink ribbon is detected. After the detection, the carriage is moved back a sufficient distance enough to cover the area where the ink ribbon and the printing paper remains stuck together while rotating the ink ribbon feeding reel in the reversed direction. In this manner, the stuck ink ribbon is automatically separated from the printing paper when the ink ribbon comes to end. It is no longer necessary to strip the ink ribbon from the printing paper by hand which was required in the case of the prior art printer. The present invention, therefore, enables exchange of the used ink ribbon for a new one in a very simple and easy manner.

What we claim is:

1. A thermal printer comprising:

a thermal head having a plurality of heatable printing elements which transfer a coating on a support material adjacent to a recording medium to said recording medium in response to the application of heat to said printing elements;

control means for moving the position of said thermal head relative to said recording medium beyond to a preset end point for recording by said thermal head on said recording medium; and means for separating said support material from said recording medium in accordance with the movement of the position of said thermal head subsequent to the preset end point.

2. A printer as set forth in claim 1 wherein said control means includes means for shifting the position of said thermal head to said recording medium in the direction in which the recording was carried out.

3. A printer as set forth in claim 1 wherein said control means includes means for shifting the position of said thermal head relative to said recording medium in the direction opposite to the recording direction.

4. A printer as set forth in claim 1 which further comprises means for moving said thermal head relative to said recording medium.

5. A thermal printer comprising:

a thermal head having a plurality of heatable printing elements which transfer a coating on a support material adjacent to a recording medium to said recording medium in response to the application of heat to said printing elements;

control means for controlling a recording breadth available for recording information on said recording medium by said thermal head;

means for moving said thermal head relative to said recording medium further beyond the recording breadth controlled by said control means; and means for separating said support material from said recording medium in accordance with the movement of the position of said thermal head beyond the recording breadth.

6. A printer as set forth in claim 5 wherein said coating is used which contains ink fusible by heat from said thermal head.

7. A printer as set forth in claim 6 which further comprises means for pressing said thermal head against said recording medium through said coating.

8. A printer as set forth in claim 5 which further comprises means for making an indication of support material exchange after said head moving means has moved said relative position of said thermal head to said recording medium.

9. In a thermal printer of the type which has a thermal head provided with heating resistor and an ink ribbon containing heat fusible ink and in which recording is carried out by pressing said thermal head against a recording paper through said ink ribbon so as to fuse said heat fusible ink, the improvement comprising:

means for detecting the end of said ink ribbon;

means for shifting the position of said thermal head relative to said recording medium in response to the end detection by said detection means; and means for stripping said ink ribbon from said recording medium according to the direction in which the position of said thermal head is shifted by said shifting means.

10. A thermal printer as set forth in claim 9 wherein said detection means is formed of photo coupler.

11. A thermal printer comprising:

a recording head having an element which transfers a coating on a support material adjacent to a recording medium to said recording medium by melting said coating with said element, control means for adjusting the relative position of said recording head to said recording medium subsequent to the end of a recording by said recording head, and means for separating said support material from said recording medium in accordance with the adjustment of the relative position.

12. A printer as set forth in claim 11 wherein said recording head is a thermal head.

13. A printer as set forth in claim 11 wherein said control means comprises means for moving said recording head to move said relative position.

* * * * *

UNITED STATES PATENT AND TRADEMARK OFFICE
CERTIFICATE OF CORRECTION

PATENT NO. : 4,387,380

DATED : June 7, 1983

INVENTOR(S) : OSAMU ASAKURA, ET AL.

It is certified that error appears in the above-identified patent and that said Letters Patent is hereby corrected as shown below:

Column 3, line 19, after "recording" insert --head--.

Column 10, line 14, change "carriages" to --carriage--;

line 29, after "line" insert --of--;

line 30, after "line" insert --of--;

line 33, change "inkribbon" to --ink ribbon--.

IN THE CLAIMS:

Column 11, line 11, Claim 1, line 8, delete "to", (second occurrence)

line 20, Claim 2, line 3, after "head" insert --relative--.

Signed and Sealed this

*Sixth* Day of *December 1983*

[SEAL]

*Attest:*

GERALD J. MOSSINGHOFF

*Attesting Officer* *Commissioner of Patents and Trademarks*